(No Model.) 10 Sheets—Sheet 1.

R. A. BREUL.
CHAIN MAKING MACHINE.

No. 559,770. Patented May 5, 1896.

Fig. 1.

Witnesses
Geo. E. Davis.
E. A. Balloch.

Inventor
RICHARD A. BREUL
By Baldwin Davidson & Wight
Attorneys (No Model.) 10 Sheets—Sheet 4.
R. A. BREUL.
CHAIN MAKING MACHINE.

No. 559,770. Patented May 5, 1896.

Witnesses
Geo. E. Davis.
E. A. Bulloch.

Inventor
RICHARD A. BREUL
By Baldwin Davidson & Wight.
Attorneys

(No Model.)

R. A. BREUL.
CHAIN MAKING MACHINE.

No. 559,770.

Patented May 5, 1896.

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

CHAIN-MAKING MACHINE.

SPECIFICATION forming part of Letters Patent No. 559,770, dated May 5, 1896.

Application filed November 18, 1895. Serial No. 569,336. (No model.)

*To all whom it may concern:*

Be it known that I, RICHARD A. BREUL, a citizen of the United States, and a resident of Bridgeport, in the county of Fairfield and State of Connecticut, have invented certain new and useful Improvements in Chain-Making Machines, of which the following is a specification.

In my United States Patent No. 545,266, of August 27, 1895, I have shown a chain composed of links made of wire, the ends of which are swaged, overlapped, and interlocked.

The object of my present invention is to provide a machine for the manufacture of chains such as shown in said patent. I have invented a machine for this purpose which is automatic in every respect; but my automatic machine involves novel mechanism for performing the several separate operations in the manufacture of the chain referred to. These mechanisms separately considered and as hereinafter claimed are believed to be within the scope of my present invention, and I therefore wish it understood that my claims are not limited to a machine automatic in every particular.

In carrying out my invention I take wire from a coil, cut it into suitable blanks, partially bend the blanks and swage the ends thereof, then cause the swaged ends to overlap and engage. My machine is preferably constructed to twist each link as it is formed in order to complete it.

The accompanying drawings illustrate a machine constructed in the best way now known to me for carrying out my invention. Some of the parts may be used without the others and in machines differing somewhat in details of construction from that herein shown so long as said machines are adapted to perform the several necessary operations in the formation of the wire links produced in accordance with my invention.

Figure 12:
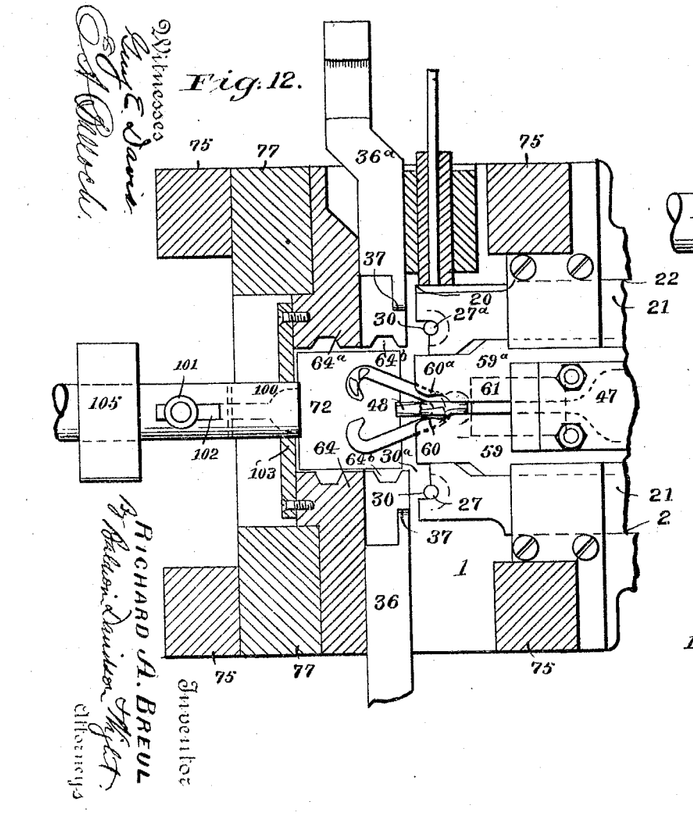
Figs. 12, 13, and 14 are enlarged detail sectional plan views similar to Figs. 9 and 10, showing the successive stages of operation necessary to complete the link.
Figure 14:
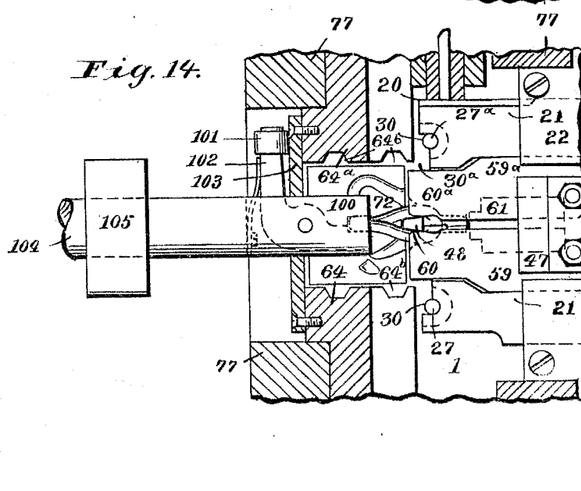
Figures 15, 16, 17, 18, 19, 20, 21, 22, 23:
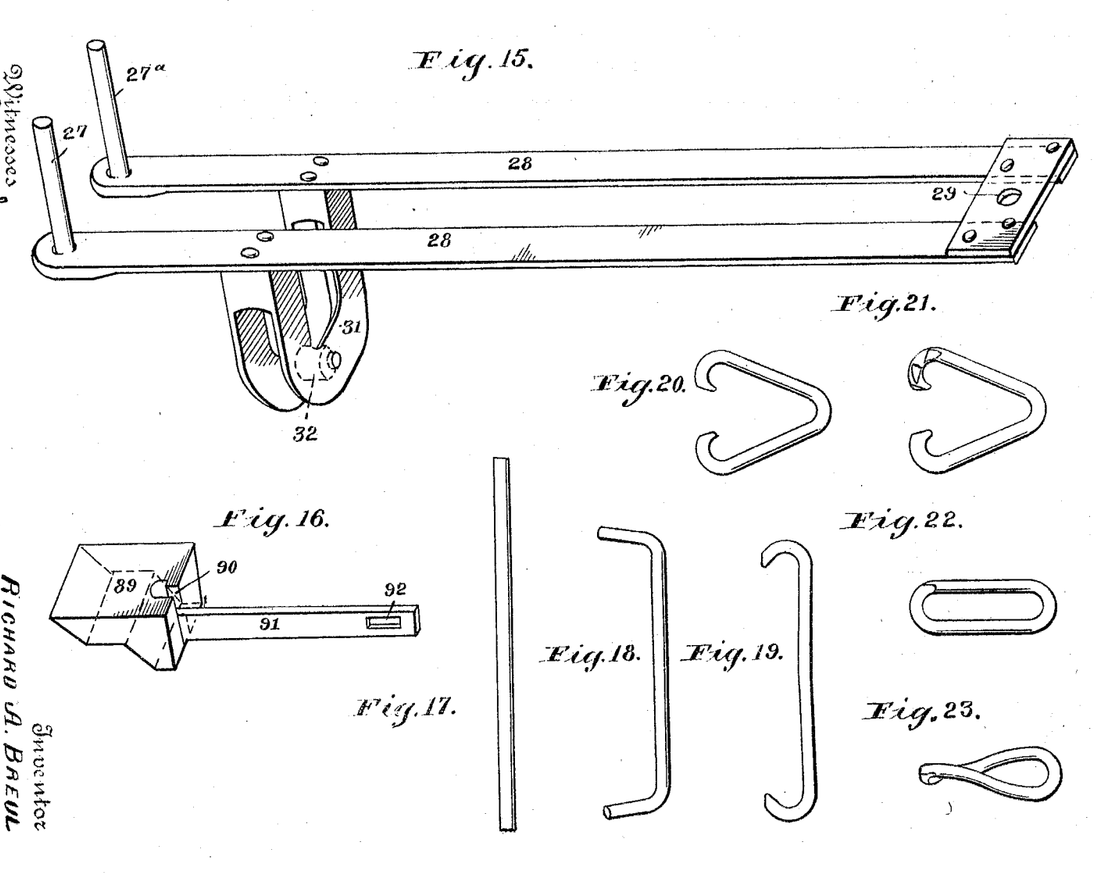
Fig. 15 is an enlarged perspective view of the two rods around which the free ends of the wire are bent and the mechanism supporting said rods.
Fig. 16 is an enlarged detail perspective view of one of the inclined slides which operate upon the slides containing the dies for swaging or forming indentations in the wire blank.
Figs. 17 to 23, inclusive, illustrate the blank in different stages of the formation of the link.

The machine, as shown, is organized to perform six distinct operations to take the wire from the coil and form it into a continuous chain made up of links constructed in accordance with my patent before referred to. The first of said operations is performed by horizontal slides, which are formed to cut off the exact length of wire introduced by the feeding device and required for the construction of a link, said slides being operated to bend the two free ends of this blank forward against the forming-rods, leaving said ends at nearly a right angle to the body portion, as shown in Fig. 18. The next operation is performed by slides operating at a right angle to the slides which performed the previous operation. From the construction shown in Fig. 11 it will be understood that by a continued inward movement of the slides the cutting edges thereof will act to shear off the outer corners of the opposite ends of the blank, leaving it practically as shown in Fig. 19. The third operation is performed by a slide which is mounted independently of but between the arms of the horizontal slides above referred to. This inner slide comes forward and bends the blank practically into V shape against a vertically-moving post, as shown in Fig. 12. The next operation is that of forming, by vertically-moving dies, indentations in the curved ends of the blank, as shown in Figs. 12 and 21. After the indentations are formed the free ends are brought together to overlap in such a manner that the interlocking surfaces thereof register and engage with each other. The sixth and final operation completes the link, as shown in Figs. 14 and 23, said Fig. 14 illustrating the forward and rotary movement of the gripping-jaw, which brings the overlapping ends firmly together and twists the link, as illustrated.

Referring to the numerals of reference marked upon the drawings, 1 indicates the bed; 2, the base; 3, the vertical posts connecting said base and bed; 4, the power-shaft, and 5 the power-wheel mounted thereon. Said shaft is suitably journaled in boxes 6, secured to the rear posts of the machine, and is provided with a pinion 7, which meshes with a gear 8, secured to a cam-shaft 9, mounted in boxes 10 immediately above the power-shaft before mentioned. From this cam-shaft are operated the different sets of mechanism necessary to perform the several operations upon the blank for forming the completed link.

Figures 6, 7:
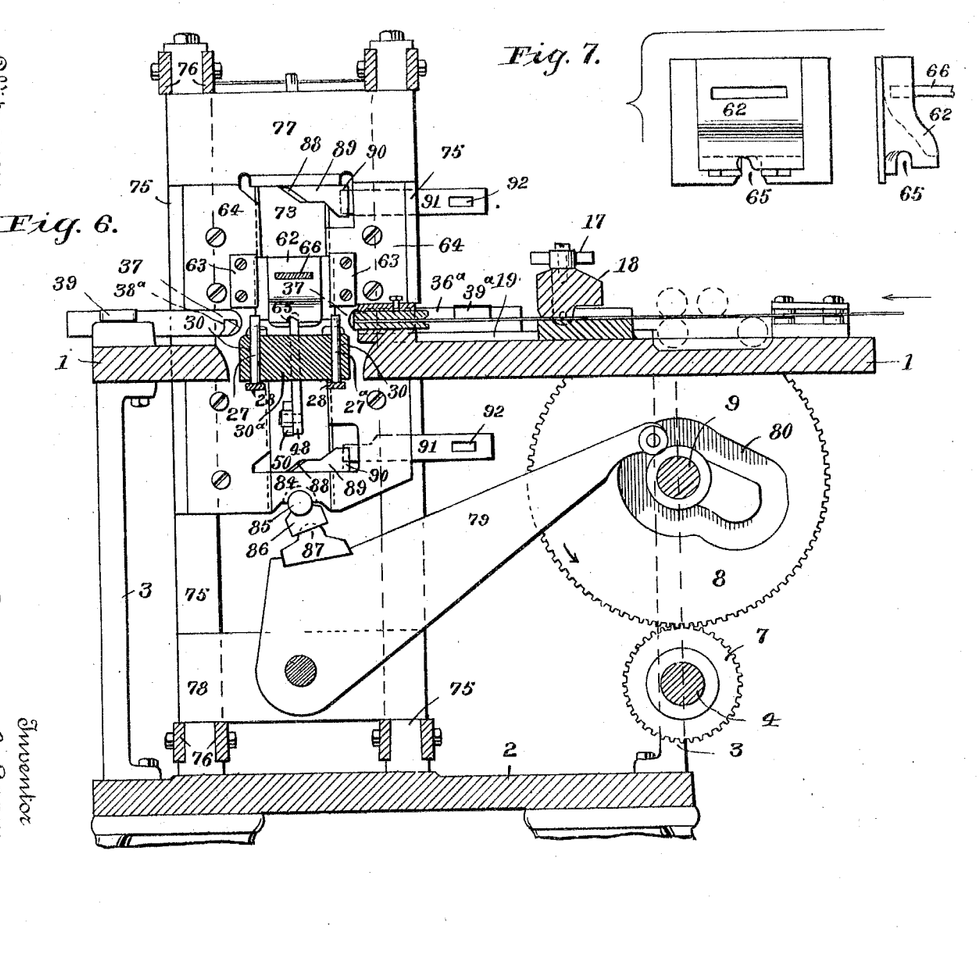
Fig. 6 shows a central cross-section on the line *c c* of Fig. 1.
Fig. 7 shows, on an enlarged scale, a front view and also a side view of part of the mechanism for centering the link while a new link-blank is being inserted.

As before stated, the first operation of my machine is that of feeding the desired length of wire forward to form a link-blank. This operation will be best understood with reference to Figs. 1, 2, and 6. The feeding mechanism is operated from the cam 11, mounted upon the outer end of the cam-shaft 9. A lever 12, pivoted at 13 to the bed and having a link connection 14 with a bell-crank lever 15, pivoted at 16 to the bed, is provided with a fork 17 upon its inner end to engage a suitable feeding device 18, which is fitted in ways 19, secured to the bed. It is obvious that by the rotation of the cam above mentioned the levers will so operate the feeding device as to reciprocate the same forward and backward in its ways, thus feeding the wire an equal distance at each operation thereof.

Figure 9:
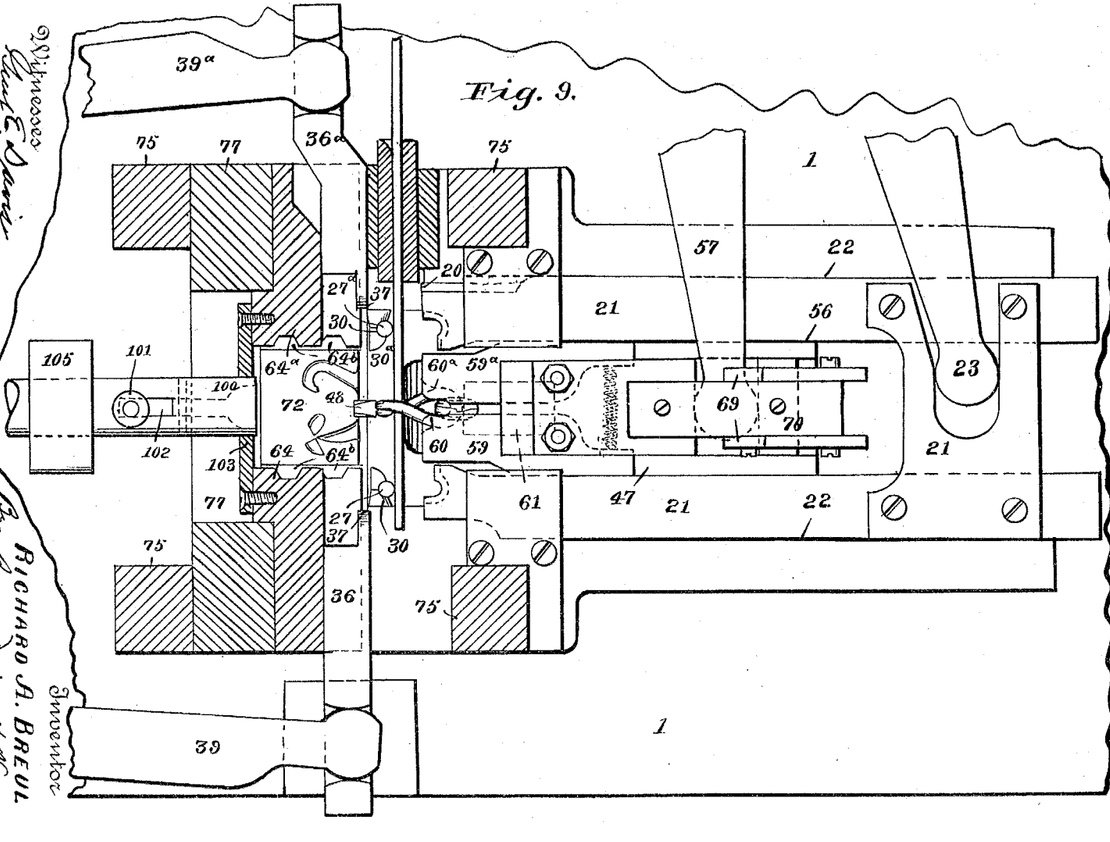
Fig. 9 is an enlarged detail sectional plan view of the tools which form the links, said parts being shown in the position they assume just prior to the severing of the blank.
Figures 10, 11:
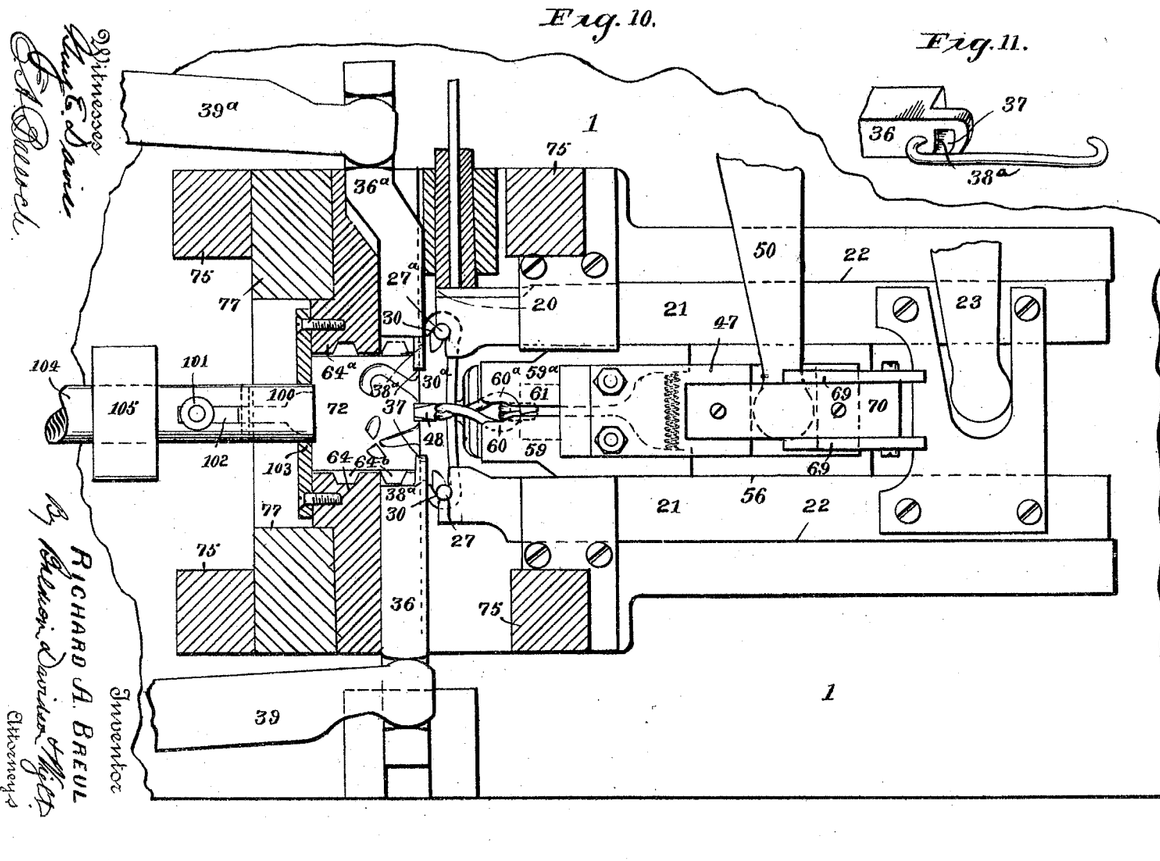
Fig. 10 is a similar sectional view illustrating the first and second operations, which bend the opposite free ends of the wire blank and at the same time shave off the outer corners of the ends thereof.
Fig. 11 is a detail perspective view showing one of the slides which assists in the bending operation and also trims off the corners of the outer ends of the wire.

The operation of severing the blank from the wire will be best understood with reference to Figs. 9 and 10 of the drawings, the first figure showing the wire prior to being severed and the latter the position of the tools after the wire is severed. This severing operation is performed by the cutting edge 20 on the double slide 21, which also performs the initial bending operation, as indicated in Fig. 18. The slide 21 is fitted in suitable ways 22 in the bed, and is reciprocated therein by means of the lever 23, which is pivoted at 24 to the bed of the machine (see Fig. 1) and bears a roller on one end to engage the groove 25 of the cam 26, secured to the camshaft 9 before mentioned.

In connection with the operation just described I employ a pair of vertically-movable rods 27 and 27$^a$, around which the initial bending operations are performed. Said rods are mounted upon a movable support 28, secured at 29 to the under side of the bed, and slide vertically through bores 30 in the block 30$^a$, secured to the bed of the machine. Attached to the under side of the support above mentioned is a yoke 31, bearing a roller 32 for engagement of the lever 33, pivoted to a bracket 34 on the under side of the bed and having a roller upon its rear end for engagement of the cam-groove 35 in the before-mentioned cam 26. The action of this cam is to operate the mechanism just recited in such manner as to retain the rods before mentioned in an elevated position during the initial bending of the wire blank and to lower said rods below the surface of the bed during the remaining operations.

The next operation (illustrated in Figs. 10, 11, and 19) is performed by the sister slides 36 and 36$^a$. When the blank is bent to the position shown in Fig. 18, its ends are inserted into the recesses 37. The slides are then moved toward each other transversely of the machine to bend the ends of the blank around the rods 27 and 27$^a$ into the shape shown in Fig. 19, and the further inward movement of the sister slides causes the edges 38$^a$ to shear off the extreme ends of the blank, these shorn-off portions being received into the recesses 37 and carried back when the slides recede and dropped through openings in the bed. The amount of metal shorn off is trifling, there being practically no waste in the stock, as the blank is not shortened, but simply chamfered, as is clearly illustrated in Figs. 19, 20, and 21. The means whereby these sister slides are operated are in part duplicate mechanism (see Figs. 1, 3, and 10) and consist of levers 39 and 39$^a$, pivoted at 40 and 40$^a$, having link connections 41 and 41$^a$ with the vertically-disposed ends 42 and 42$^a$ of bell-crank levers 43 and 43$^a$, which levers are provided with a toggle connection 44, whereby the two sets of mechanisms are operated simultaneously. The lever 43$^a$ is provided with an arm 45, the outer end of which carries a roller to engage a cam-groove 46 in the side of the gear-wheel 8 upon the cam-shaft 9, previously described. It will therefore be readily understood that by reason of the connections thus described the sister slides are operated from this cam-groove and given simultaneous inward and outward movements to perform the operations for which they are designed.

Figure 8:
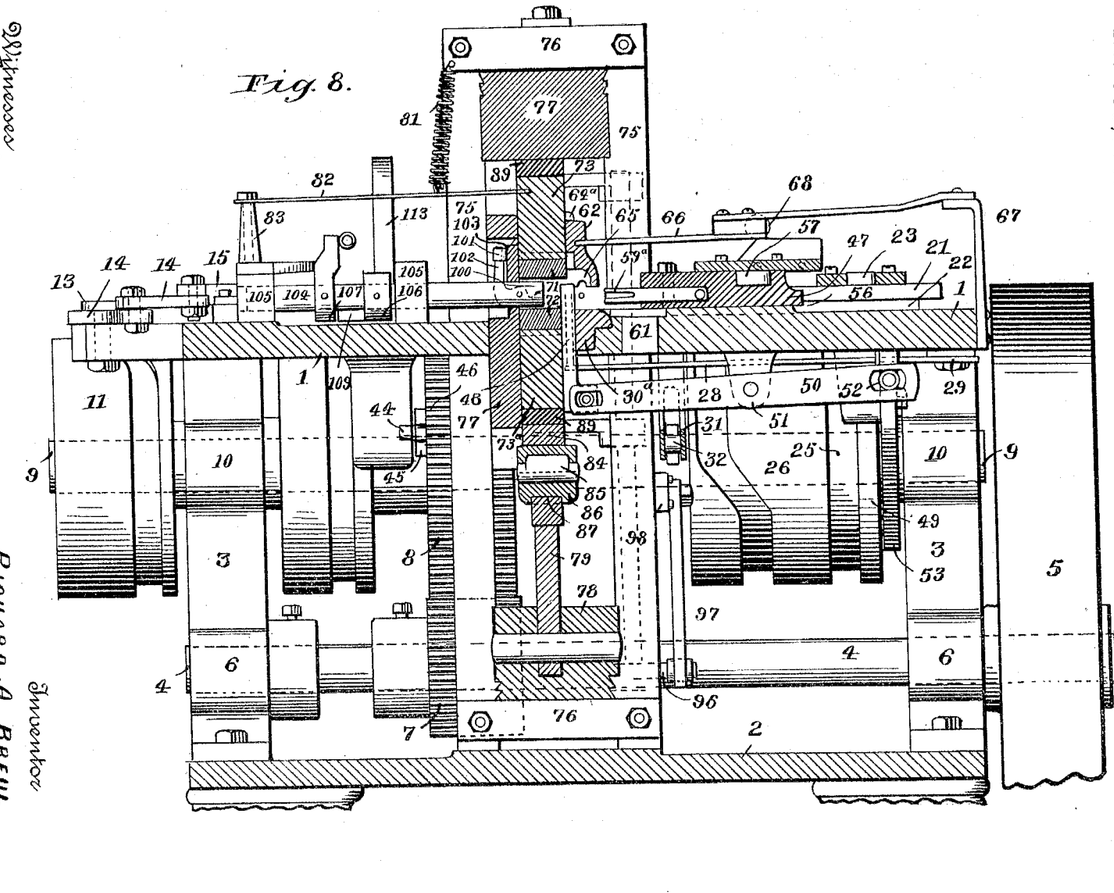
Fig. 8 is a central longitudinal section on line *d d* of Fig. 1, looking rearward.

The next operation upon the wire blank is the forming of the same into practically a V shape, such as shown in Figs. 12, 20, and 21. This operation is performed by means of the slide 47 and the vertically-movable post 48. Just prior to this operation, however, it may be well for me to state that the vertical rods 27 and 27ª have been drawn down out of the way, so as to allow of the bending of the wire blank. Referring to Figs. 8, 10, and 12, it will be observed that the vertically-movable post 48 is fitted within a suitable recess in the before-mentioned block 30ª of the bed, and is raised and lowered therein by its connections with the cam-groove 49 in the side of the cam 26 before mentioned. Said connections consist of a lever 50, pivoted to a bracket 51 on the under side of the bed, the inner end of said lever engaging a roller on the post and the outer end thereof a similar roller 52 on the lever 53, which is in like manner pivoted to a bracket 54, its rear end bearing a roller to engage the cam-groove 49 before mentioned. Said slide 47 is suitably fitted in ways 56 between and slightly below the slide 21 and the ways 22 before mentioned, and is reciprocated therein by means of the lever 57 in connection with the cam-groove 58 of the cam 26 before mentioned. The slide 47 carries a pair of spring-actuated pivoted jaws 59 and 59ª, the forward inner surfaces of which are provided with suitable recesses 60 and 60ª, conforming to the shape of the wire and so arranged as to bend the blank at its center into a V shape in such manner that one side thereof will be slightly above the other, so that said hook-like ends will properly overlap each other in the final closing operation. Immediately below these jaws I provide a suitable hole 61 in the bed to admit of the exit of the completed chain.

In order to center and place the previously-formed link in position while the slide 47 is drawn outward and the wire is being fed in and the ends thereof operated upon, I employ a vertically-movable centering-block 62, (shown in Figs. 6 and 8 and in detail in Fig. 7,) which block is guided by slides in the plates 63, secured to vertical ways 64 and 64ª, screwed to the press-body 77. The lower portion of this block is provided with suitable recesses 65 to accommodate the special shape of the link and the wire to be fed therethrough. Said block is raised and lowered at proper intervals by means of an arm 66, engaging the same, said arm being secured to a post 67, secured to the bed of the machine, and is provided with rolls 68, which are engaged by the incline 69 on the plate 70, secured to the slide 47. From this construction it will be obvious that when said slide is drawn outward the roll upon the arm 66 will ride down the incline, thus lowering the block upon the chain-link and the new wire blank contained therein and centering the same, in which position said block remains during the initial operations, whereupon it is again raised by the forward movement of said slide for the purpose of bending the blank into V shape.

The next operation is that of swaging the curved ends to produce interlocking surfaces or teeth on the inner sides thereof. This operation is performed by vertically-movable compression-dies 71 and 72, which dies are secured to slides 73 and 73ª, moving in grooves 64ᵇ in the ways 64 and 64ª. These ways are arranged on the press-body 77, incased and held in position by four upright posts 75, which pass up vertically through a suitable opening in the bed-plate and are secured together by means of bracing cross-pieces 76, all of which constitute the press-frame, as clearly appears in the drawings. Upon the lower cross-pieces 76 I provide in a similar manner blocks 78, between which is hinged the lever 79 for operating said dies, which lever is provided with rollers to engage the cam-groove 80 in the side of the gear-wheel 8 before mentioned. The slides containing the compression-dies are free to move vertically in the grooves of the ways 64 and 64ª, and the upper slide is normally held in an elevated position, as shown in Fig. 8, by means of the action of the spring 81, which engages a strip 82, connected with said die, and whose outer end is rigidly secured to the post 83. The normal or downward position of the lower die-slide is also shown in said Fig. 8. (See also Fig. 6.) Said slide, as shown, rests upon an intermediate sliding block 84, which is provided with a centrally-located shaft 85, whose under side is engaged by a toggle-block 86, which in turn is engaged and operated by a knuckle 87 on the lever 79 before mentioned. I provide in the bottom of the sliding block 84 a V-shaped recess to accommodate the movement of the toggle 86. The special constructions above mentioned are designed to develop great pressure on the dies and insure durability of all the mechanism employed, even under an accidental excessive strain.

Figures 4, 5:
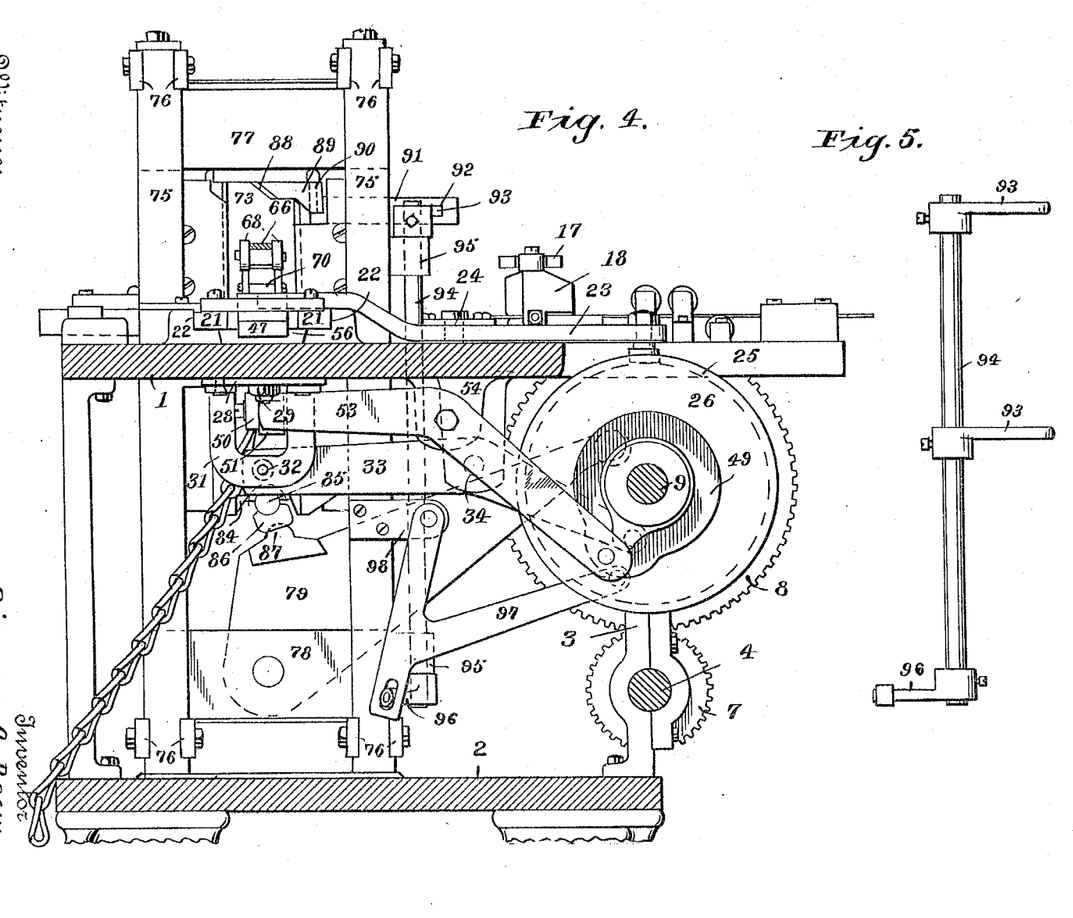
Fig. 4 shows a cross-section on the line *b b* of Fig. 1.
Fig. 5 is a detail view showing part of the mechanism for operating the swaging-dies.

Owing to the space between the normal position of the upper and lower dies, as shown in Fig. 8, which space is necessary to admit of the introduction of the mechanism for twisting the link, I provide means for simultaneously bringing these dies together to their point of operation by means of mechanism which I will now describe. (See Figs. 4, 5, and 6.)

The top of the upper die and the bottom of the lower die are each provided with inclined surfaces 88, engaged by the inclined slides 89, which are forced between said die-slides and the press-body 77 at the top and the sliding block 84 at the bottom, it being obvious that these slides during their inward movement engage and close said dies against the resistance of the weight of the lower die and the spring 81 of the upper die, and the final and swaging movement of said lower die is performed by the lever 79 and its toggle connections. Each of these inclined slides 89 is provided with a vertical recess 90 to receive the enlarged heads of the bars 91, whose outer ends are provided with orifices 92 to receive the arms 93 of the vertical rock-shaft 94, which shaft is mounted in suitable bearings 95 upon the post 75. The lower end of this rock-shaft is further provided with an arm 96, which is engaged by the lower extremity of the bell-crank lever 97, pivoted to the bracket 98, the rearwardly-disposed arm of said lever bearing a roller which is engaged by the cam-groove 99 in the side of the before-mentioned cam 26. It will thus be seen that with the successive rotations of this cam 26 the bell-crank lever will rock the vertical shaft, the arms of which will engage the bars 91 and move the same in and out, together with the inclined slides.

Figure 13:
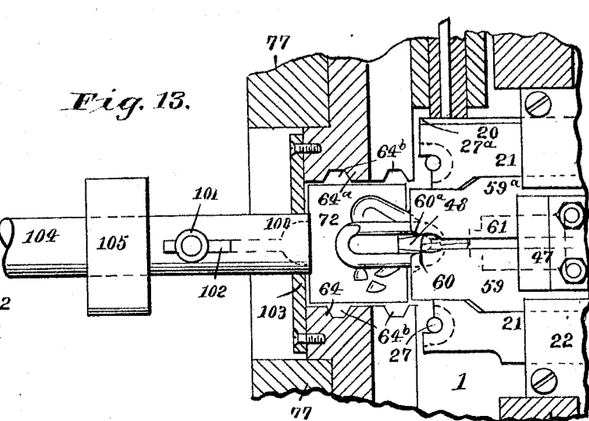

After the curved ends of the blank are swaged, as above described, and as shown in Fig. 21, and after the compression-dies have resumed their normal position the closing operation is performed, which folds the link together, substantially as shown in Figs. 13 and 22. This operation is performed by the slide 47 and its spring-actuated jaws before described, and is performed by a second forward movement of said slides and jaws, as shown in Figs. 13 and 14, it being obvious that this further movement of said jaws will have a tendency to close the wire blank together, as shown. This operation leaves the two bent and swaged ends of the wire directly in line and partially engaged with each other.

The next and final operation upon the blank is that of twisting the same, as shown in Figs. 14 and 23, which operation, in addition to twisting the blank, firmly secures the curved swaged ends thereof together. The mechanism for performing this operation consists of a cylindrical gripping-head 100, which is moved forward from the position shown in Fig. 13 until the recess between the jaws thereof engages the overlapping hooked ends of the blank, at which instant the roll 101 of the pivoted jaw 102 will engage the plate 103, thereby operating said jaw to grip the said end of the link. Thereupon the gripping-head will be given a quarter-rotation, thus twisting and completing the link, as shown in Fig. 14. The gripping-head now releases the link and the slide returns with the same to its normal position, (shown in Fig.) 9, in which position the wire is fed forward again and threaded through the link just completed. While the gripping-head is withdrawing from between the compression-dies the initial operations on the next link are performed in the manner above described.

The mechanism whereby the gripping-head is given the several movements referred to is as follows: The shaft 104 of the gripping-head is mounted in suitable bearings 105, secured to the bed of the machine, and secured to said shaft are collars 106 and 107, between which is operatively fitted the forward rounded end of the lever 108, which is pivoted at 109 to the bed of the machine and bears a roller upon its rear end to engage the cam-groove 110 in the face of the cam 111. This mechanism serves to force the gripping-head inward to the position shown in Fig. 14 of the drawings, and thereby to engage and clamp together the overlapping link ends.

Figure 1:
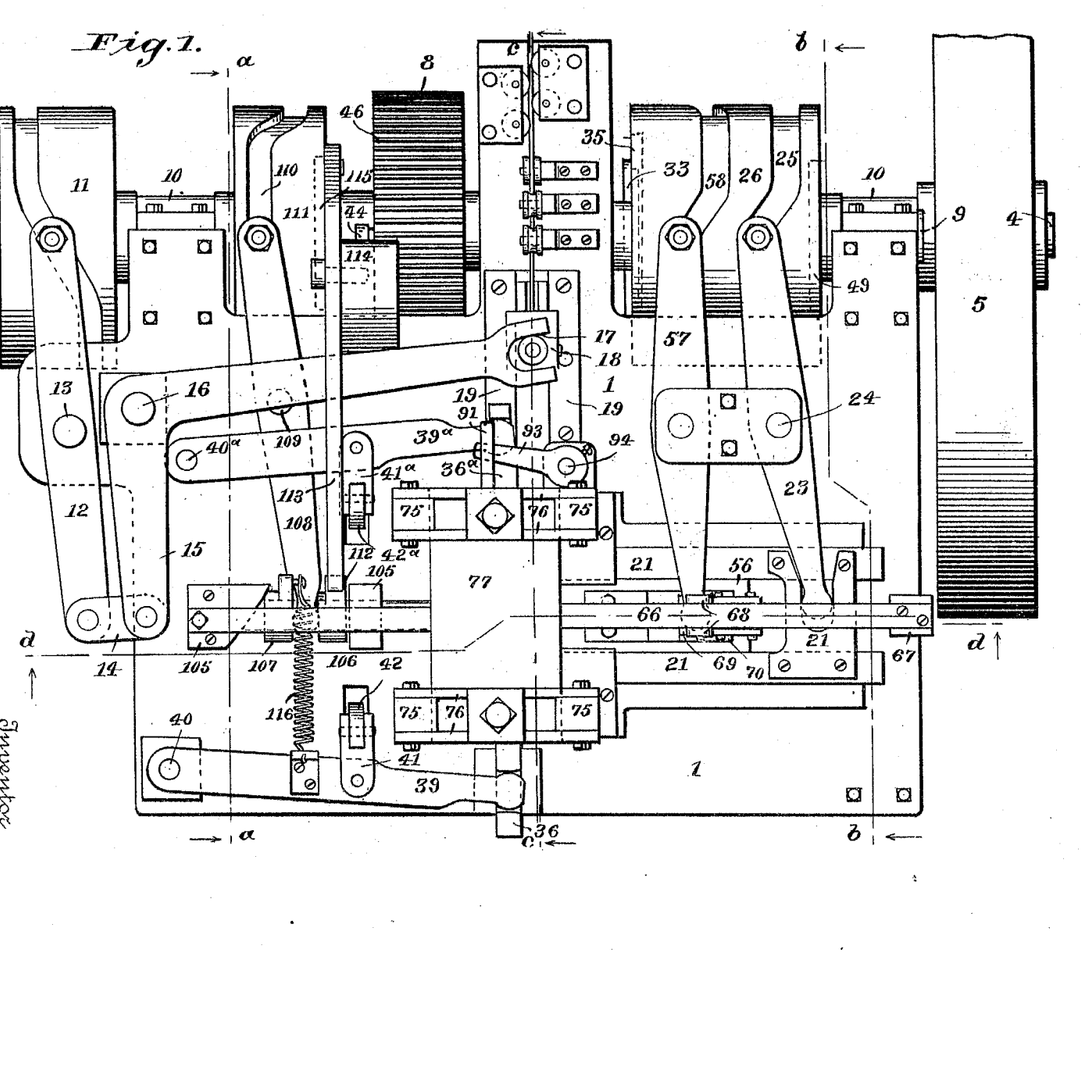
Figure 1 shows a plan view of a machine embodying my improvements.
Figure 2:
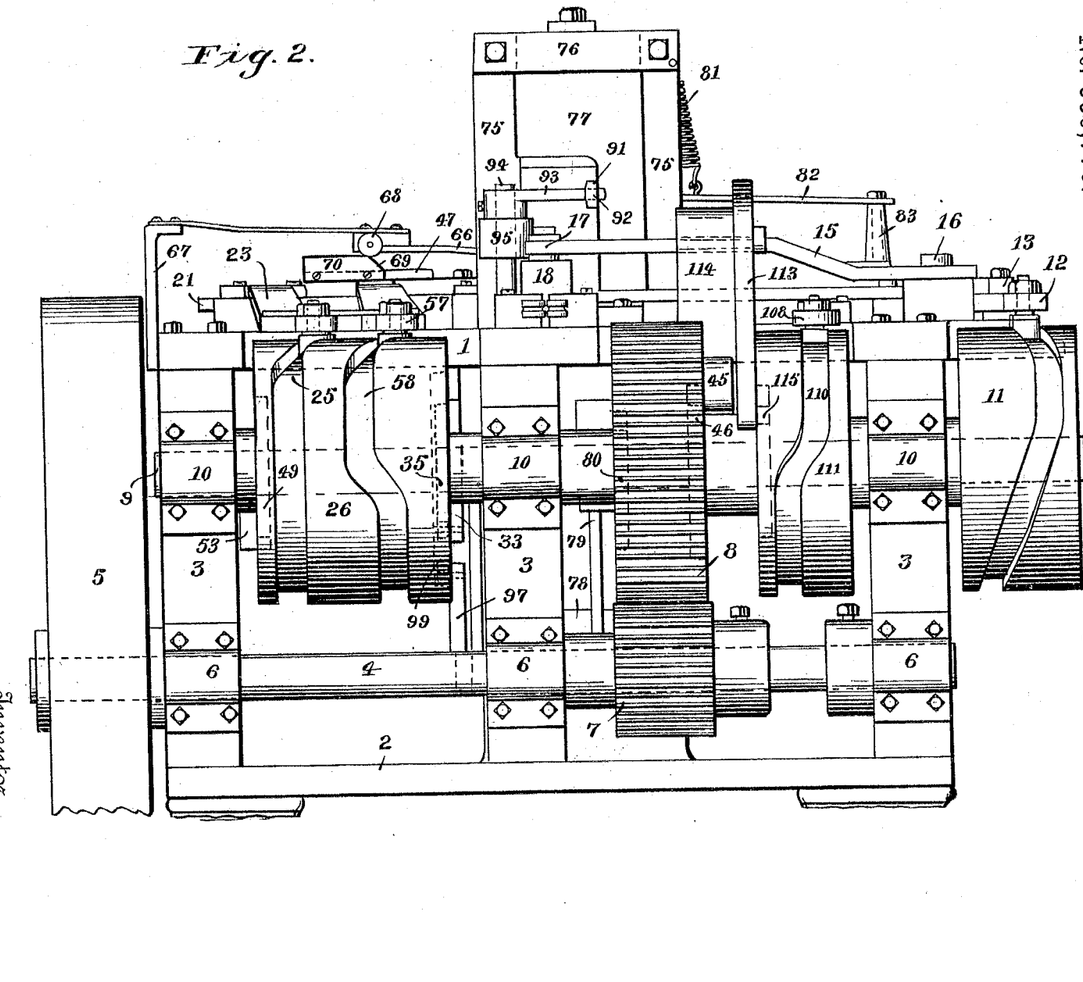
Fig. 2 shows a rear elevation of the same.
Figure 3:
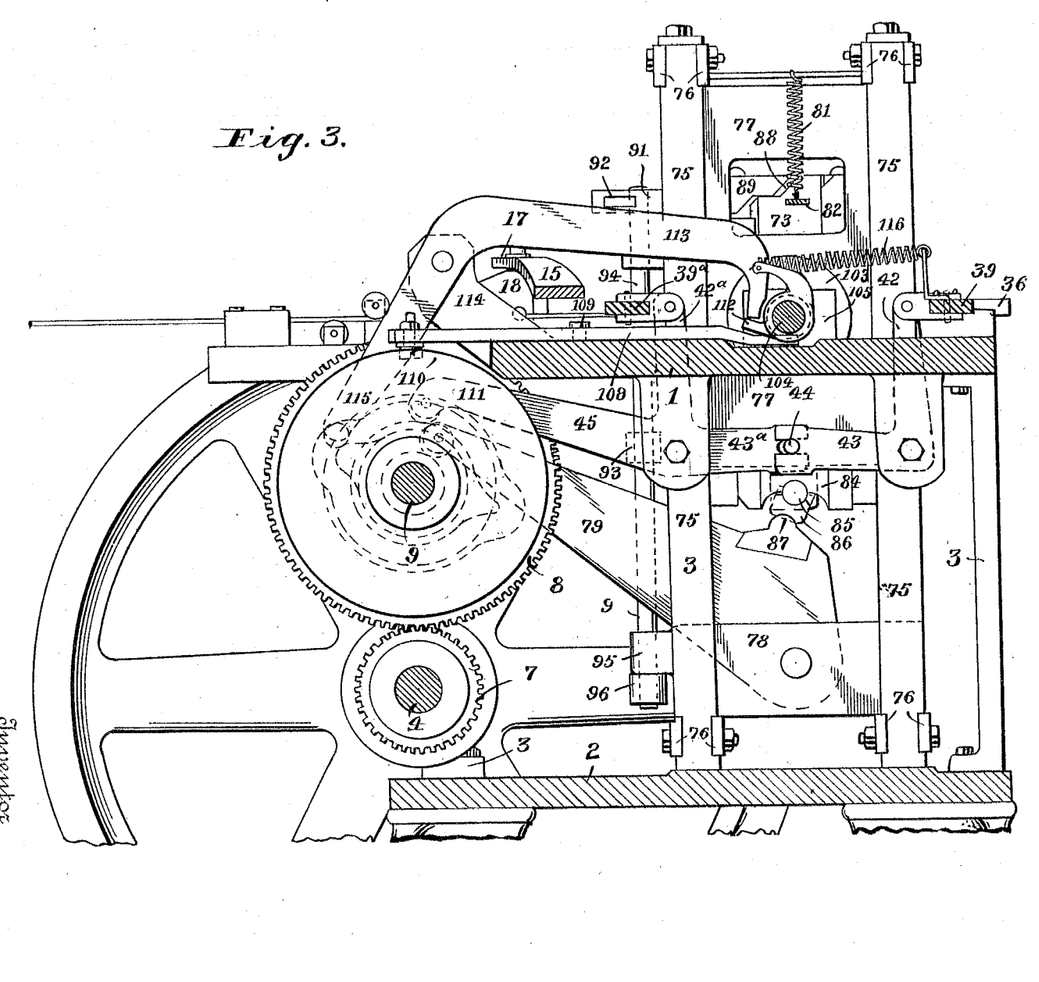
Fig. 3, a cross-section on the line *a a* of Fig. 1.

In addition to this inward movement said gripping-head is given a quarter-rotation by the following mechanism, (see Figs. 1 and 3:) The collar 106 is provided with a lug 112, which is engaged by a depending end of the lever 113, which is pivoted to the bracket 114 of the bed, said lever being provided with a roll to engage the cam-groove 115 of the cam 111 before mentioned. It will thus be seen that with each rotation of said cam the forward depending end of said lever will be forced downward against the lug of the collar secured to the gripping-head shaft, turning the same against the action of the spring 116, connected therewith.

The operation of the machine is substantially as follows: The machine is started with the wire properly inserted into the feeding device, whereupon the feeding mechanism advances the required length of wire and threads the same through the link last completed. The slide 21 now moves forward, severs the blank to the desired length, and thereafter with the same movement the operative surfaces thereof will engage the free ends of the wire and bend the same against and around the vertical rods extending through the bores of the block in the bed, after which the sister slides operate simultaneously, first engaging the extreme ends of the wire blank, bending the same around the vertical rods, after which the cutting edges of said slides engage and chamfer the ends of the blank, leaving the same in the shape shown in Fig. 19. Said slides then return to their normal position, and the rods around which the ends of the blank have been turned are withdrawn from the blank to a position below the bed, thus leaving the ends of the blank free to move ahead. The center slide 47 next moves forward, the jaws thereof engaging the blank and folding the same into substantially a V shape, as is shown in Fig. 20. Said slide remains in this position during the action of the compression or swaging dies, the first movements of which are effected by means of the inclined slides 89, which are forced in against the inclined surfaces 88 by their connections with the vertical rock-shaft previously described, after which the lever 79 operates together with its toggle mechanism, which serves to force up the lower die, thus compressing the ends of the wire against the upper die, thereby swaging the ends of the blank and forming therein interlocking surfaces or teeth. With the completion of this operation the mechanism controlling the dies operates in such manner as to allow the same to return to their normal position, whereupon the slide 47 again moves forward sufficiently to fully close the blank, as illustrated in Fig. 13. The gripping-head then moves forward and operates to twist the blank, the roll on the arm of the jaw thereof extending in a vertical position until it engages with the plate 103, which engagement causes said jaw to close, at which instant the mechanism for rocking said head operates in such manner as to move the same a quarter-rotation, the roll of the jaw riding upon the plate before mentioned, after which the post is drawn down from the link. This operation completes the link and upon being released from the gripping-head it is carried forward with the return movement of the slide 47, while the gripping-head returns toward its normal position.

The several sets of devices for performing the operation just described are arranged and timed to work harmoniously to produce links and join them into a continuous chain, which is complete in every respect as it leaves the machine and ready for use.

I claim as my invention—

1. A chain-making machine provided with means for swaging teeth in the ends of each link-blank, and mechanism for bending the blank into proper form to complete the link and join the toothed ends.

2. The combination, substantially as set forth, of means for swaging teeth in the ends of a blank, means for then bending the blank to give proper form to the link, and means for interlocking the teeth in the ends of the link.

3. The combination, substantially as set forth, of mechanism for partially bending a wire blank, means for swaging the bent ends of the blank to form interlocking teeth therein, and mechanism for then closing and completing the link.

4. In a chain-making machine, the combination, substantially as set forth, of mechanism for bending a wire blank at its opposite ends to form curved portions adapted to overlap and constitute one end of the link, dies for swaging teeth in said curved ends of the blank, and means for then completing the link.

5. The combination, substantially as set forth, of mechanism for partially bending a blank to form portions adapted to overlap, dies for swaging teeth in the ends of the blank, mechanism for overlapping the curved toothed ends of the blank, and devices for then twisting the link and causing the curved ends to firmly engage.

6. The combination with mechanism for bending the ends of the blank, of means for folding the blank into a V shape, dies for forming indentations or teeth in the connecting surfaces of the opposite ends of the blank, and means for closing the ends of the blank together.

7. In a chain-making machine, the combination of mechanism, for bending the ends of a blank to form portions adapted to overlap and form one end of the link, devices for trimming or chamfering the extreme ends of these curved portions, means for centrally bending the link and causing the curved portions to overlap, and means for clamping and twisting the link, substantially as described.

8. In a chain-making machine, the combination of mechanism for bending the ends of the wire blank to form curved portions adapted to overlap, devices for trimming or chamfering the extremities of said curved portions, means for bending the blank into V shape, dies for forming teeth in the curved portions of the link, and mechanism for closing, overlapping and joining said curved portions.

9. In a machine for making wire chain, the combination of mechanism for feeding and cutting the wire into lengths, slides for bending the ends of the wire, the upper and lower dies adapted to form teeth on the curved ends of the blank, devices for moving the slides toward and from each other, mechanism for applying powerful pressure to the dies to form the teeth in the link-blank, and mechanism for closing the link and joining the toothed portions thereof.

10. In a chain-making machine, the combination of the vertical rods around which the ends of the wire blank are bent, the horizontally-moving slides which bend the wire blank around said rods, the sister slides arranged in the same horizontal plane as the horizontally-moving slides before mentioned, mechanism for reciprocating said sister slides in opposite directions to act upon the curved ends of the blank to still further bend them, and mechanism for bending the blank centrally and completing the link.

11. In a wire-chain-making machine, the combination of the feeding and severing mechanism, movable rods adjacent to the severing mechanism, a slide operating upon the ends of the blank to curve them around the rods, mechanism for folding the ends of the link toward each other, dies for swaging the curved ends to form interlocking teeth therein, means for uniting said interlocking ends, and devices for twisting the links.

12. In a wire-chain-making machine, the combination of the feeding and severing mechanism, the movable rods in front of which the blank is fed, means for curving the ends of the blank around said rods, mechanism for trimming or chamfering the extreme ends of the blank, a movable post, means for folding the blank into V shape around said post, and means for closing and interlocking the free curved ends of the blank, substantially as described.

13. In a chain-making machine, the herein-described mechanism for curving the ends of a wire blank, which consists of the vertical rods adapted to rise into a position intersecting the line of feed of the wire blank, means for curving the ends of the blank around said rods, cutters for trimming or chamfering the ends of the wire, and means for lowering the rods to allow the free forward movement of the ends of the blank.

14. In a chain-making machine, the combination with the rods, benders for curving the ends of the blank around said rods, and slides adapted to engage and shape the ends of the curved portions of the blank, and to chamfer the extreme ends thereof.

15. In a wire-chain-making machine, the combination of the blank feeding and severing mechanism, the vertically-movable rods, a slide which operates upon the ends of the blank to curve them around said rods, the bending-slides arranged at right angles to the slides above mentioned, means for folding the blank into V shape, swaging-dies for forming interlocking teeth in the curved ends of the blank, means for closing the V-shaped blank, and means for twisting the link, substantially as described.

16. In a chain-making machine, the combination with the mechanism for bending the ends of a wire blank, a vertically-movable post, means for folding the blank into V shape around said post, dies for forming indentations in the adjacent surfaces of the opposite ends of the blank, and means for closing the ends of the blank together, substantially as described.

17. The combination, substantially as set forth, of means for severing a link-blank, means for bending the blank at its ends, devices for forming teeth or indentations in the curved or bent ends of the blank, means for closing the link, and centering devices to hold the link when formed in place while a new blank is being threaded through it.

18. The combination of the wire-feeding mechanism, the slides having recesses, pins opposite the recesses in said slides about which the wire blank is bent, means for presenting and withdrawing the pins, means for reciprocating the slides, another slide having a recess adapted to engage with the center of the blank, a post about which the center of the blank is bent, means for presenting and withdrawing the post, means for operating the slide to bend the blank at its center, means for joining the link, and mechanism for twisting it.

19. The combination with means for bending the ends of a blank to form curved portions, of means for further bending these curved portions and for trimming or chamfering the extremities, and means for closing the link.

Signed at Bridgeport, in the county of Fairfield and State of Connecticut, this 16th day of November, A. D. 1895.

RICHARD A. BREUL.

Witnesses:
C. M. NEWMAN,
ARCHIBALD SMITH.